United States Patent
Lin et al.

(10) Patent No.: US 10,976,768 B2
(45) Date of Patent: Apr. 13, 2021

(54) CLOCK ADJUSTING DEVICE AND TRANSMISSION SYSTEM, AND METHOD THEREOF

(71) Applicant: NUVOTON TECHNOLOGY CORPORATION, Hsinchu (TW)

(72) Inventors: Chang-Hong Lin, Hsinchu Science Park (TW); Chieh-Sheng Tu, Hsinchu Science Park (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 26 days.

(21) Appl. No.: 16/585,084

(22) Filed: Sep. 27, 2019

(65) Prior Publication Data

US 2020/0103931 A1  Apr. 2, 2020

(30) Foreign Application Priority Data

Oct. 2, 2018 (TW) .................................. 107134833

(51) Int. Cl.
 *G06F 1/08* (2006.01)
 *G06F 13/42* (2006.01)
(52) U.S. Cl.
 CPC ............ *G06F 1/08* (2013.01); *G06F 13/4291* (2013.01); *G06F 2213/0042* (2013.01)
(58) Field of Classification Search
 CPC ..................................... G06F 1/08; G06F 1/10
 See application file for complete search history.

(56) References Cited

U.S. PATENT DOCUMENTS

| | | | | |
|---|---|---|---|---|
| 8,090,335 B1* | 1/2012 | Bataineh | ................ | H03L 7/113 455/260 |
| 8,415,997 B2* | 4/2013 | Li | ........................... | H03L 7/095 327/156 |
| 8,677,172 B2* | 3/2014 | Anderson | ........ | G01R 31/31709 713/500 |
| 9,502,956 B1* | 11/2016 | Yeo | ........................ | G01R 31/26 |
| 2003/0014763 A1* | 1/2003 | Chappell | ................ | H04H 20/78 725/111 |

(Continued)

FOREIGN PATENT DOCUMENTS

TW    I530799 B    4/2016

*Primary Examiner* — Phil K Nguyen
(74) *Attorney, Agent, or Firm* — Muncy, Geissler, Olds and Lowe, P.C.

(57) ABSTRACT

A clock adjusting device includes an oscillator, a first counter, a second counter, a count comparator and a threshold comparator. The oscillator transmits an operation clock signal. The first counter counts a reference clock signal, to obtain a reference clock count value. The second counter counts the operation clock signal to obtain an operation clock count value. The count comparator compares the reference clock count value with the operation clock count value, to obtain a candidate correction value. The oscillator adjusts the operation clock signal according to an output correction value. The threshold comparator compares the candidate correction value and an updated threshold. When the candidate correction value is lower than the updated threshold, the candidate correction value is used as the output correction value, and when the candidate correction value exceeds the updated threshold, a current correction value is used as the output connection value.

9 Claims, 5 Drawing Sheets

(56) References Cited

U.S. PATENT DOCUMENTS

| | | | | |
|---|---|---|---|---|
| 2004/0252052 A1* | 12/2004 | Kitatani | ............ | G01S 19/34 |
| | | | | 342/357.62 |
| 2006/0087352 A1* | 4/2006 | Byun | ............ | G01R 23/005 |
| | | | | 327/156 |
| 2006/0132190 A1* | 6/2006 | Driediger | ............ | G01R 23/10 |
| | | | | 327/47 |
| 2019/0280695 A1* | 9/2019 | Lindgren | ............ | H03L 7/08 |

* cited by examiner

CLOCK ADJUSTING DEVICE AND TRANSMISSION SYSTEM, AND METHOD THEREOF

CROSS-REFERENCE TO RELATED APPLICATION

This application claims the benefit of Taiwan Patent Application No. 107134833, filed on Oct. 2, 2018, in the Taiwan Intellectual Property Office, the disclosure of which is incorporated herein in its entirety by reference.

BACKGROUND OF THE INVENTION

1. Field of the Invention

The present invention relates to a clock adjusting device, more particularly to a clock adjusting device using a count comparator and a threshold comparator to adjust an operation clock signal, and a transmission system thereof, and a method thereof.

2. Description of the Related Art

With the advancement of technology, the universal serial bus (USB) interface becomes a fairly common device, and a USB device can perform data transmission with a computer through USB interface. In general, a conventional USB device is provided with a precise inductor-capacitor oscillator to generate an operation clock signal, a processor of the computer can send a reference clock signal to the USB device, and a comparator of the USB device can compare the operation clock with the reference clock signal, to obtain a correction value for regulating the operational clock signal; however, above-mentioned clock correction manner is unable to eliminate noise interference on the correction value, and the operation clock signal is possibly incorrectly adjusted because of noise interference; furthermore, the inductor-capacitor oscillator usually occupies a large chip area, and it causes increase in the manufacturing cost of the USB device.

Taiwan Patent issued No. 1530799 discloses a system using a feedback control of a programmable oscillator circuit and a low-frequency signal of USB device, to make an error between the frequencies of the operation clock signal of the USB device and the reference clock signal of the processor of the computer within a tolerable range. However, when the low-frequency signal has been affected by noise, the frequency of the operation clock is also incorrectly adjusted. Therefore, the Taiwan Patent issued No. 1530799 does not disclose a solution to solve the problem that the USB device is affected by noise.

SUMMARY OF THE INVENTION

In order to solve aforementioned conventional problems, the present invention provides a clock adjusting device, a transmission system thereof and a method thereof.

According to an embodiment, the present invention provides a clock adjusting device including an oscillator, a first counter, a second counter, a count comparator and a threshold comparator. The oscillator is configured to transmit an operation clock signal. The first counter is configured to receive a reference clock signal and count the reference clock signal, to obtain a reference clock count value. The second counter is connected the oscillator to receive the operation clock signal, and configured to count the operation clock signal to obtain an operation clock count value. The count comparator is connected to the first counter and the second counter, and configured to receive and compare the reference clock count value with the operation clock count value, to obtain a candidate correction value. The threshold comparator is connected to the oscillator, and configured to provide an output correction value to the oscillator. The oscillator adjusts the operation clock signal according to the output correction value. The threshold comparator stores a current correction value and an updated threshold, and the threshold comparator is connected to the count comparator and receives the candidate correction value, and compares the candidate correction value and the updated threshold. When the candidate correction value is lower than the updated threshold, the candidate correction value is used as the output correction value, and when the candidate correction value exceeds the updated threshold, the current correction value is used as the output correction value.

According to an embodiment, the threshold comparator comprises a memory configured to store the output correction value as the current correction value.

According to an embodiment, when the candidate correction value exceeds the updated threshold, the oscillator does not adjust the operation clock signal.

According to an embodiment, the present invention provides a transmission system including a host device and an end device. The host device is configured to transmit the reference clock signal. The end device is in communication with the host device, and includes a clock adjusting device. The clock adjusting device includes an oscillator, a first counter, a second counter, a count comparator and a threshold comparator. The oscillator is configured to transmit the operation clock signal. The first counter is configured to receive the reference clock signal, and count the reference clock signal to obtain a reference clock count value. The second counter is connected to the oscillator and configured to receive the operation clock signal and count the operation clock signal, so as to obtain an operation clock count value. The count comparator is connected to the first counter and the second counter, and configured to receive and compare the reference clock count value with the operation clock count value, so as to obtain a candidate correction value. The threshold comparator is connected to the oscillator, and configured to provide an output correction value to the oscillator. The oscillator adjusts the operation clock signal according to the output correction value. The threshold comparator stores a current correction value and an updated threshold, and the threshold comparator is connected to the count comparator and receives the candidate correction value, and the compares the candidate correction value and the updated threshold. When the candidate correction value is lower than an updated threshold, the candidate correction value is used as the output correction value, and when the candidate correction value exceeds the updated threshold, the current correction value is used as the output correction value.

According to an embodiment, the threshold comparator includes a memory configured to store the output correction value as the current correction value.

According to an embodiment, when the candidate correction value exceeds the updated threshold, the oscillator does not adjust the operation clock signal.

According to an embodiment, the present invention provides a clock adjusting method including steps of: using an oscillator to transmit an operation clock signal; using a first counter and a second counter to count a reference clock signal and the operation clock signal, respectively, so as to obtain a reference clock count value and an operation clock count value; using a count comparator to compare the reference clock count value with the operation clock count value, to obtain a candidate correction value; using a threshold comparator, which stores a current correction value and an updated threshold, to compare the candidate correction value with the updated threshold; using the candidate correction value as the output correction value when the candidate correction value is lower than the updated threshold; using the current correction value as the output correction value when the candidate correction value exceeds the updated threshold, wherein the oscillator adjusts the operation clock signal according to the output correction value.

According to an embodiment, the threshold comparator uses the memory to store the output correction value as the current correction value.

According to an embodiment, when the candidate correction value exceeds the updated threshold, the operation clock signal of the oscillator is not adjusted.

According to above-mentioned contents, the clock adjusting device and the method of the present invention can use a count comparator and a threshold comparator to perform double comparison, so as to determine and eliminate the candidate correction value affected by noise.

According to above-mentioned content, the transmission system of the present invention can use the clock adjusting device to smoothly perform data transmission between the host device and the end device.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
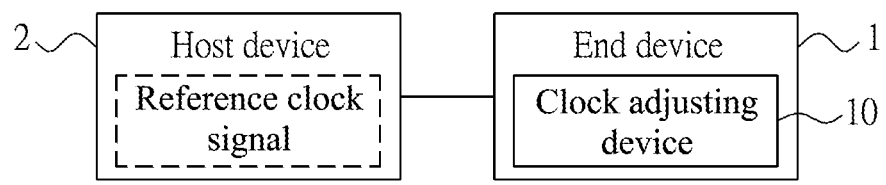
FIG. 1 is a block diagram of a transmission system of the present invention.

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be understood that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be understood to imply the inclusion of stated elements but not the exclusion of any other elements.

Please refer to FIG. 1, which is a block diagram of a transmission system of the present invention. As shown in FIG. 1, the transmission system includes a host device 2 and an end device 1. In an embodiment, the end device 1 can be a USB peripheral device, for example, a mouse, a keyboard or a USB hard disk; the host device 2 can be a computer or a music player, or other device having the same function, and the present invention is not limited thereto. The host device 2 can transmit a reference clock signal REF. The end device 1 is in communication with the host device 2, and comprises a clock adjusting device 10. The detailed illustration of operation mechanism of the clock adjusting device 10 is described below.

Figure 2:
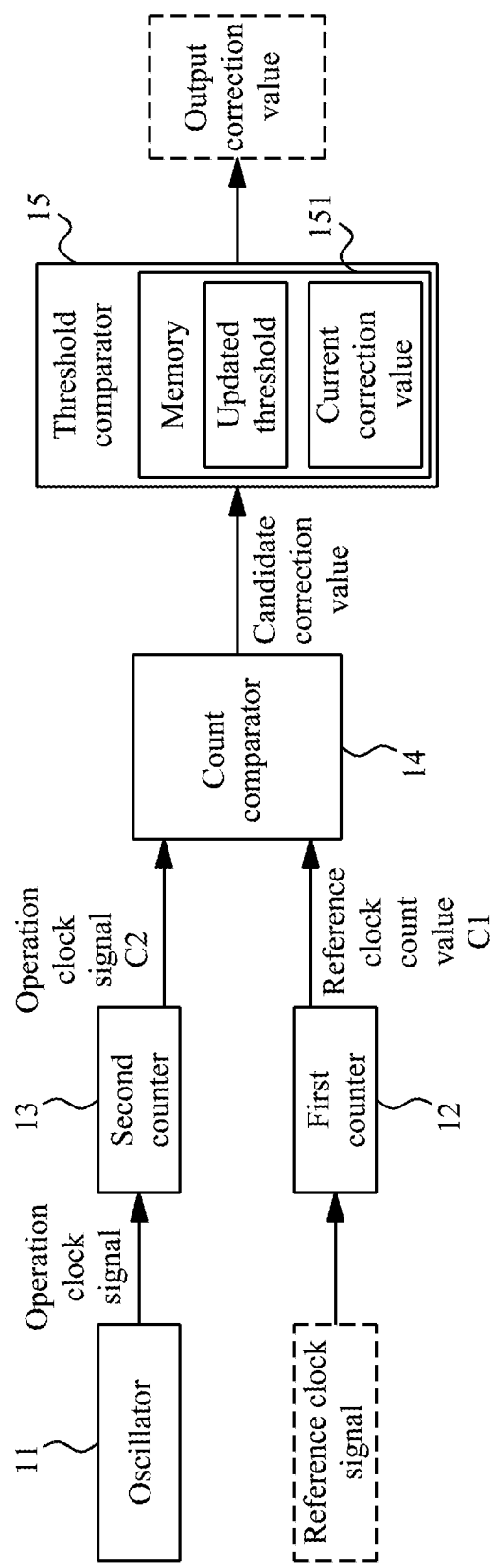
FIG. 2 is a block diagram of a clock adjusting device of the present invention.

Please refer to FIG. 2, which is a block diagram of a clock adjusting device of the present invention. The clock adjusting device 10 includes an oscillator 11, a first counter 12, a second counter 13, a count comparator 14 and a threshold comparator 15. The oscillator 11 can transmit an operation clock signal WORK. The first counter 12 can receive the reference clock signal REF, and count the reference clock signal REF to obtain a reference clock count value C1. The second counter 13 is connected to the oscillator 11 to receive the operation clock signal WORK, and count the operation clock signal WORK to obtain an operation clock count value C2. The count comparator 14 is electrically connected to the first counter 12 and the second counter 13, and receives and compares the reference clock count value C1 and the operation clock count value C2, so as to generate a candidate correction value CAND. The threshold comparator 15 is connected to the oscillator 11 and the count comparator 14, and comprises a memory 151 storing a current correction value CUR and an updated threshold THRE, and the threshold comparator 15 provides an output correction value OUT to the oscillator 11, and the oscillator 11 can adjust the operation clock signal WORK according to the output correction value OUT. Based on the two comparisons performed by the clock adjusting device 10, data transmission between the host device 2 and the end device 1 can be smoothly performed.

Figure 3:
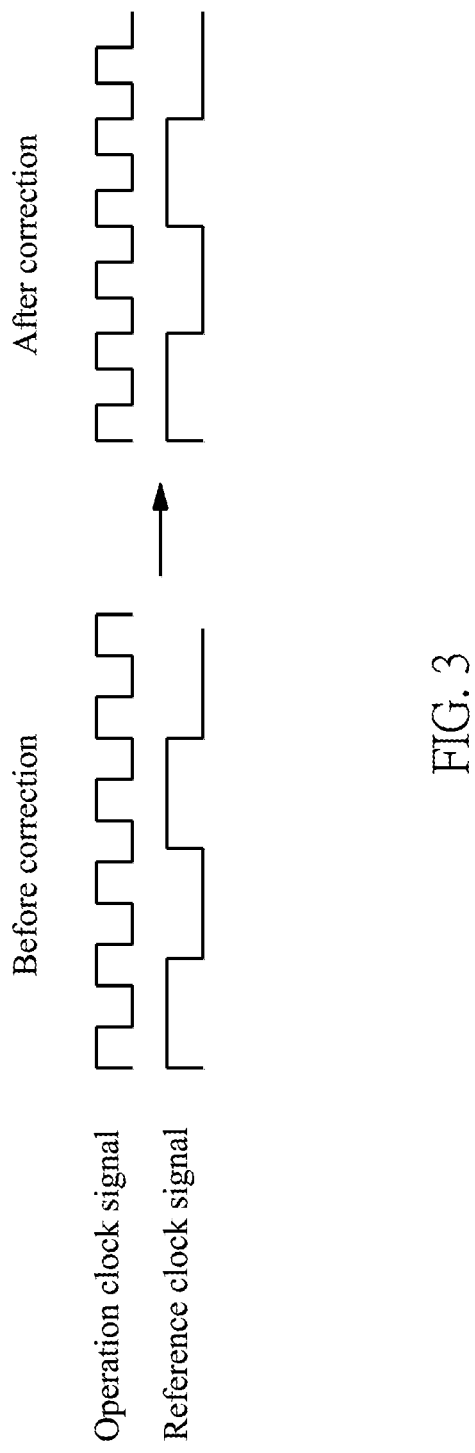
FIG. 3 is a signal waveform diagram of a clock adjusting device not interfered by noise, according to the present invention.
Figure 4:
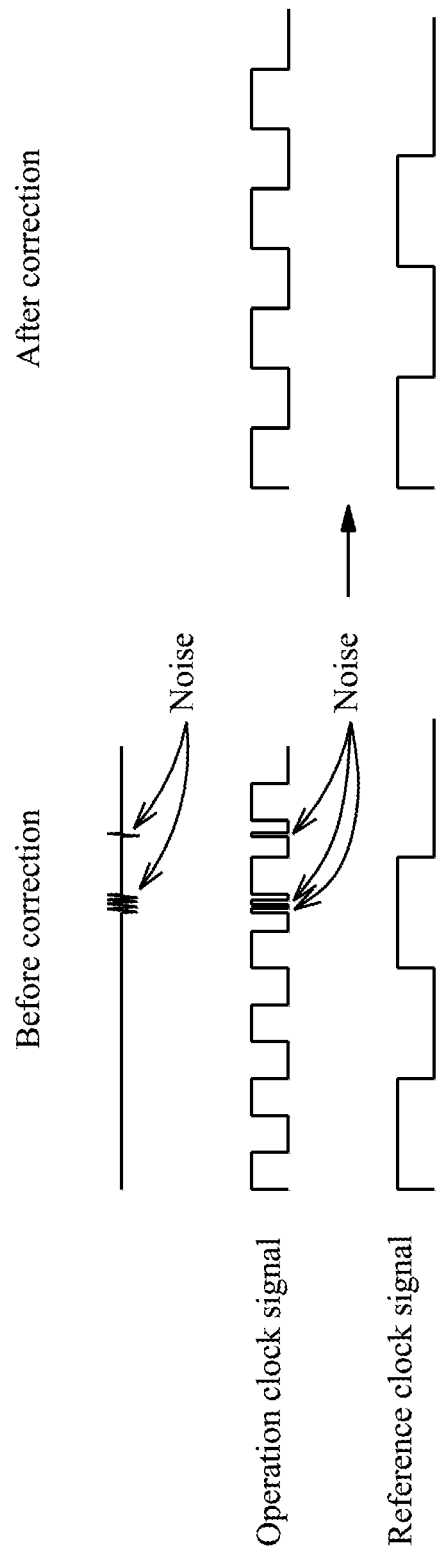
FIG. 4 is a signal waveform diagram of a clock adjusting device interfered by noise, according to the present invention.

Please refer to FIGS. 3 and 4, which are signal waveform diagrams of the clock adjusting device being interfered or not being interfered, according to the present invention, respectively. The operation of threshold comparator 15 is described with reference to FIGS. 1 to 4. First, the threshold comparator 15 receives the candidate correction value CAND and compares the candidate correction value CAND with the updated threshold THRE, and when the candidate correction value CAND is lower than the updated threshold THRE, the candidate correction value CAND is used to update the current correction value CUR stored in the memory 151, and the candidate correction value CAND is also used as the output correction value OUT. As shown in FIG. 3, the oscillator 11 adjusts the operation clock signal WORK according to the candidate correction value CAND, to make a difference between the frequencies of the reference clock signal REF and the operation clock signal WORK within an error range specified in Universal Serial Bus Implementers Forum (USB-IF). Secondly, the threshold comparator 15 receives the candidate correction value CAND, and compares the candidate correction value CAND and the updated threshold THRE, and when the candidate correction value CAND exceeds the updated threshold THRE, it indicates that the candidate correction value CAND is interfered by noise, so the current correction value CUR is used as the output correction value OUT. Under the noise interference, if the candidate correction value CAND is used as the output correction value OUT, the wrong frequency adjustment for operation clock signal WORK possibly occurs, as shown in FIG. 4, and it causes a greater error between the frequencies of the operation clock signal WORK and the reference clock signal REF. For this reason, the memory 151 does not store and use this candidate correction value CAND as the current correction value CUR, and the current correction value CUR still is the candidate correction value CAND stored in the memory 151 in last time. The oscillator 11 can adjust the operation clock signal WORK according to the candidate correction value CAND stored in the memory 151 in last time. In other words, the oscillator 11 does not adjust the frequency of the operation clock signal WORK.

For example, when a time instant t or an updated cycle t is k (that is, t=k), the threshold comparator 15 receives the candidate correction value $CAND_{t=k}$, and compares the candidate correction value $CAND_{t=k}$ with the updated threshold THRE; when the candidate correction value $CAND_{t=k}$ is within the updated threshold THRE, the memory 151 stores the candidate correction value $CAND_{t=k}$ as the current correction value CUR, and uses the candidate correction value $CAND_{t=k}$ as the output correction value OUT, and the oscillator 11 can adjust the operation clock signal WORK according to the candidate correction value $CAND_{t=k}$. When the time instant t or an updated cycle t is k+1 (that is, t=k+1), the threshold comparator 15 receives the candidate correction value $CAND_{t=k+1}$, and compares the received candidate correction value $CAND_{t=k+1}$ with the updated threshold THRE. When the candidate correction value $CAND_{t=k+1}$ is not within the updated threshold THRE, the memory 151 does not use the candidate correction value $CAND_{t=k+1}$ to update current correction value CUR. The current correction value CUR, which is $CAND_{t=k}$, is used as the output correction value OUT, and the oscillator 11 keeps the frequency of the operation clock signal WORK. In another embodiment, the threshold comparator 15 can compare a difference between the candidate correction value $CAND_{t=k}$ and $CAND_{t=k+1}$, with the updated threshold THRE, and only when the difference is within the updated threshold THRE, the candidate correction value $CAND_{t=k+1}$ is used to update the current correction value CUR, and the oscillator 11 adjusts the operation clock signal WORK according to the current correction value CUR.

Figure 5:
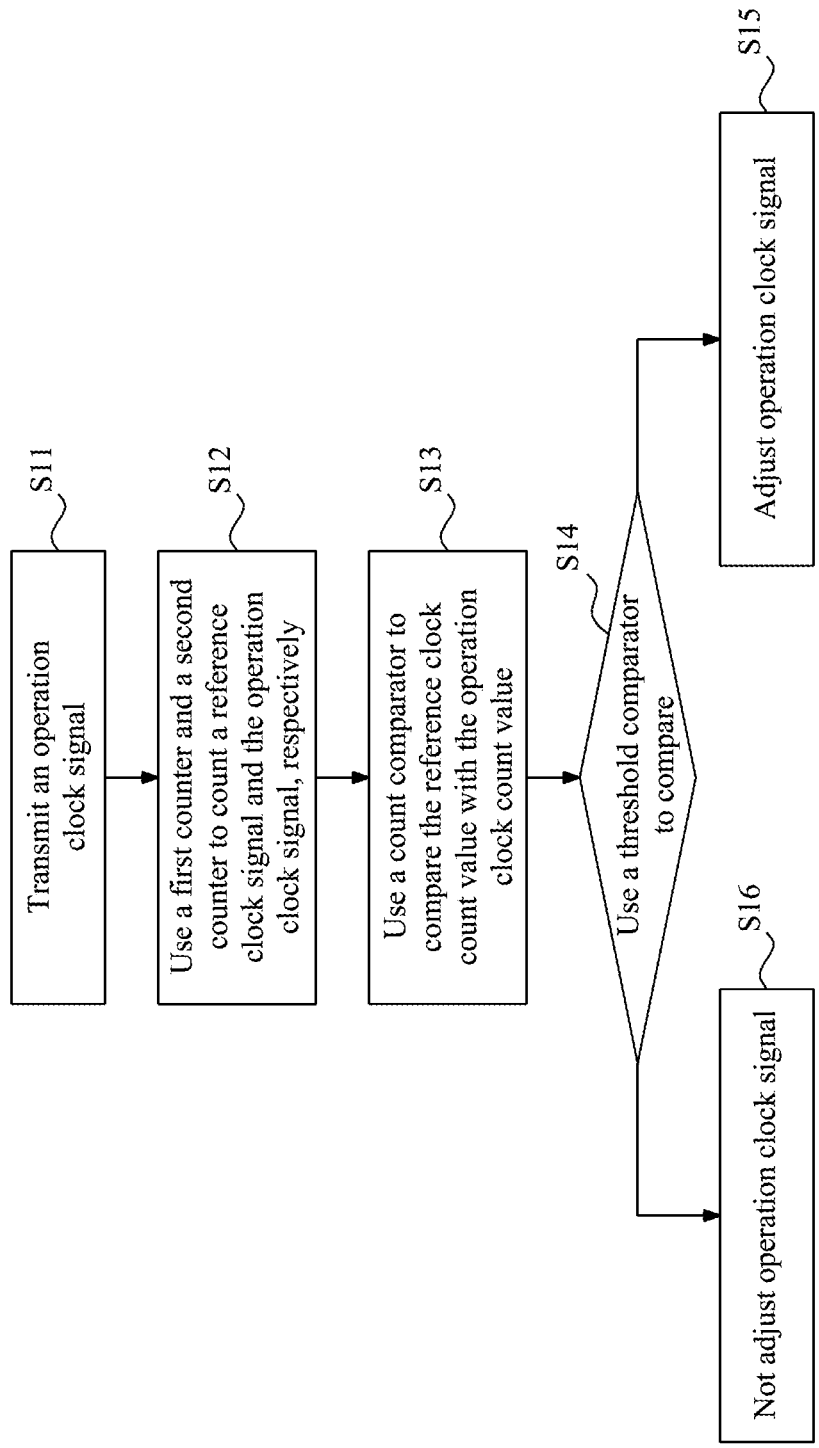
FIG. 5 is a flowchart showing the steps in an operation of a clock adjusting method of the present invention.

Please refer to FIG. 5, which is a flowchart showing the steps in an operation of a clock adjusting method of the present invention. As shown in FIG. 5, the operation of the clock adjusting device can be induced as a clock adjusting method. The steps shown in the clock adjusting method of the present invention are not limited to perform successively, and other step can be inserted in the steps if necessary. The operation of the clock adjusting method of the present invention is described below with reference to FIGS. 1, 2 and 5.

In a step S11, the oscillator 11 is used to transmit the operation clock signal WORK.

In a step S12, the first counter 12 and the second counter 13 are used to count the reference clock signal REF and the operation clock signal WORK, respectively, so as to obtain the reference clock count value C1 and the operation clock count value C2.

In a step S13, a count comparator 14 is used to compare the reference clock count value C1 with the operation clock count value C2, to obtain the candidate correction value CAND.

In a step S14, the threshold comparator 15 is used to compare the candidate correction value CAND with the updated threshold THRE, and when the candidate correction value CAND is within the updated threshold THRE, the operational flow enters a step S15, and when the candidate correction value CAND exceeds the updated threshold THRE, the operational flow enters a step S16.

In a step S15, the candidate correction value CAND is used as the candidate correction value CAND, the oscillator 11 adjusts the operation clock signal WORK according to the candidate correction value CAND, so as to make the difference between the frequencies of the reference clock signal REF and the operation clock signal WORK within the error range specified by the USB-IF.

In a step S16, the current correction value CUR is used as the output correction value OUT, and it indicates that the candidate correction value CAND is interfered by noise, so the memory 151 does not store this candidate correction value CAND as the current correction value CUR, but the candidate correction value CAND stored in the memory 151 in last time is used as the current correction value CUR. The oscillator 11 adjusts the operation clock signal WORK according to the candidate correction value CAND stored in the memory 151 in last time; in other words, the oscillator 11 does not adjust the frequency of the operation clock signal WORK.

According to the clock adjusting method of the present invention, the correction value affected by noise can be eliminated.

According to aforementioned contents, the clock adjusting device and the method of the present invention can use the count comparator 14 and the threshold comparator 15 to perform double comparison, so as determine and eliminate the candidate correction value CAND affected by noise; furthermore, the transmission system of the present invention includes a clock adjusting device 10, so that data transmission between the host device 2 and the end device 1 can be performed smoothly. The clock adjusting device, transmission system and clock adjusting method of the present invention can have aforementioned advantages, thereby eliminating the candidate correction value CAND affected by noise.

The present invention disclosed herein has been described by means of specific embodiments. However, numerous

What is claimed is:

1. A clock adjusting device comprising:
an oscillator configured to transmit an operation clock signal;
a first counter configured to receive a reference clock signal and count the reference clock signal, to obtain a reference clock count value;
a second counter configured to connect the oscillator to receive the operation clock signal, and count the operation clock signal to obtain an operation clock count value;
a count comparator connected to the first counter and the second counter, and configured to receive and compare the reference clock count value with the operation clock count value, to obtain a candidate correction value; and
a threshold comparator connected to the oscillator, and configured to provide an output correction value to the oscillator, wherein the oscillator adjusts the operation clock signal according to the output correction value;
wherein the threshold comparator stores a current correction value and an updated threshold, and the threshold comparator is connected to the count comparator and receives the candidate correction value, and compares the candidate correction value and the updated threshold;
wherein when the candidate correction value is lower than the updated threshold, the candidate correction value is used as the output correction value, and when the candidate correction value exceeds the updated threshold, the current correction value is used as the output correction value.

2. The clock adjusting device according to claim 1, wherein the threshold comparator comprises a memory configured to store the output correction value as the current correction value.

3. The clock adjusting device according to claim 1, wherein when the candidate correction value exceeds the updated threshold, the oscillator does not adjust the operation clock signal.

4. A transmission system, comprising:
a host device configured to transmit the reference clock signal; and
an end device in communication with the host device, and comprising a clock adjusting device, wherein the clock adjusting device comprises:
an oscillator configured to transmit the operation clock signal;
a first counter configured to receive the reference clock signal, and count the reference clock signal to obtain a reference clock count value;
a second counter connected to the oscillator and configured to receive the operation clock signal and count the operation clock signal, to obtain an operation clock count value;
a count comparator connected to the first counter and the second counter, and configured to receive and compare the reference clock count value with the operation clock count value, to obtain a candidate correction value; and
a threshold comparator connected to the oscillator, and configured to provide an output correction value to the oscillator, wherein the oscillator adjusts the operation clock signal according to the output correction value;
wherein the threshold comparator stores a current correction value and an updated threshold, and the threshold comparator is connected to the count comparator and receives the candidate correction value, and the compares the candidate correction value and the updated threshold;
wherein when the candidate correction value is lower than an updated threshold, the candidate correction value is used as the output correction value, and when the candidate correction value exceeds the updated threshold, the current correction value is used as the output correction value.

5. The transmission system according to claim 4, wherein the threshold comparator comprises a memory configured to store the output correction value as the current correction value.

6. The transmission system according to claim 4, wherein when the candidate correction value exceeds the updated threshold, the oscillator does not adjust the operation clock signal.

7. A clock adjusting method, comprising:
using an oscillator to transmit an operation clock signal;
using a first counter and a second counter to count a reference clock signal and the operation clock signal, respectively, so as to obtain a reference clock count value and an operation clock count value;
using a count comparator to compare the reference clock count value with the operation clock count value, to obtain a candidate correction value;
using a threshold comparator, which stores a current correction value and an updated threshold, to compare the candidate correction value with the updated threshold;
using the candidate correction value as the output correction value when the candidate correction value is lower than the updated threshold;
using the current correction value as the output correction value when the candidate correction value exceeds the updated threshold; and
wherein the oscillator adjusts the operation clock signal according to the output correction value.

8. The clock adjusting method according to claim 7, wherein the threshold comparator uses the memory to store the output correction value as the current correction value.

9. The clock adjusting method according to claim 7, wherein when the candidate correction value exceeds the updated threshold, the operation clock signal of the oscillator is not adjusted.

* * * * *